Patented Sept. 23, 1930

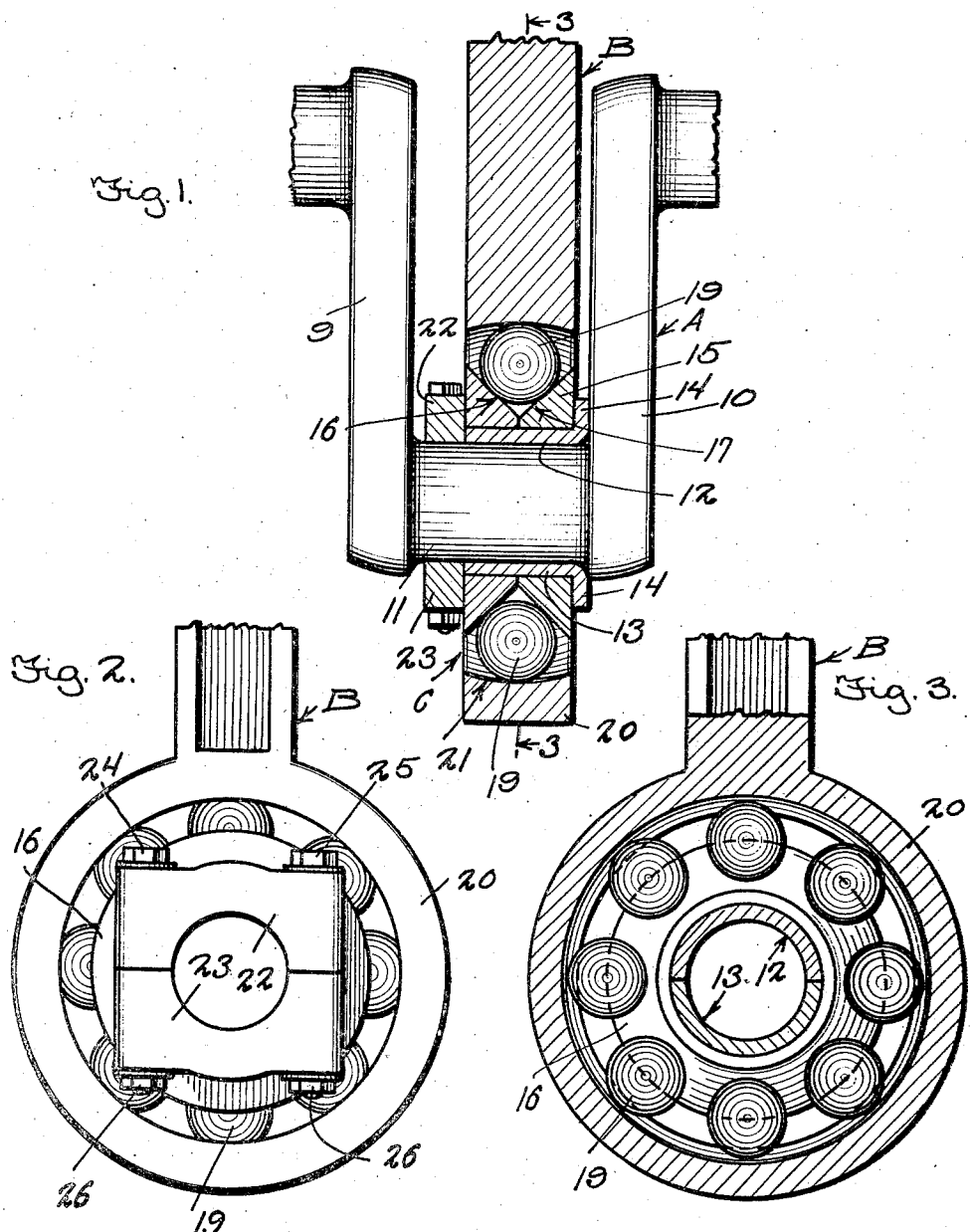

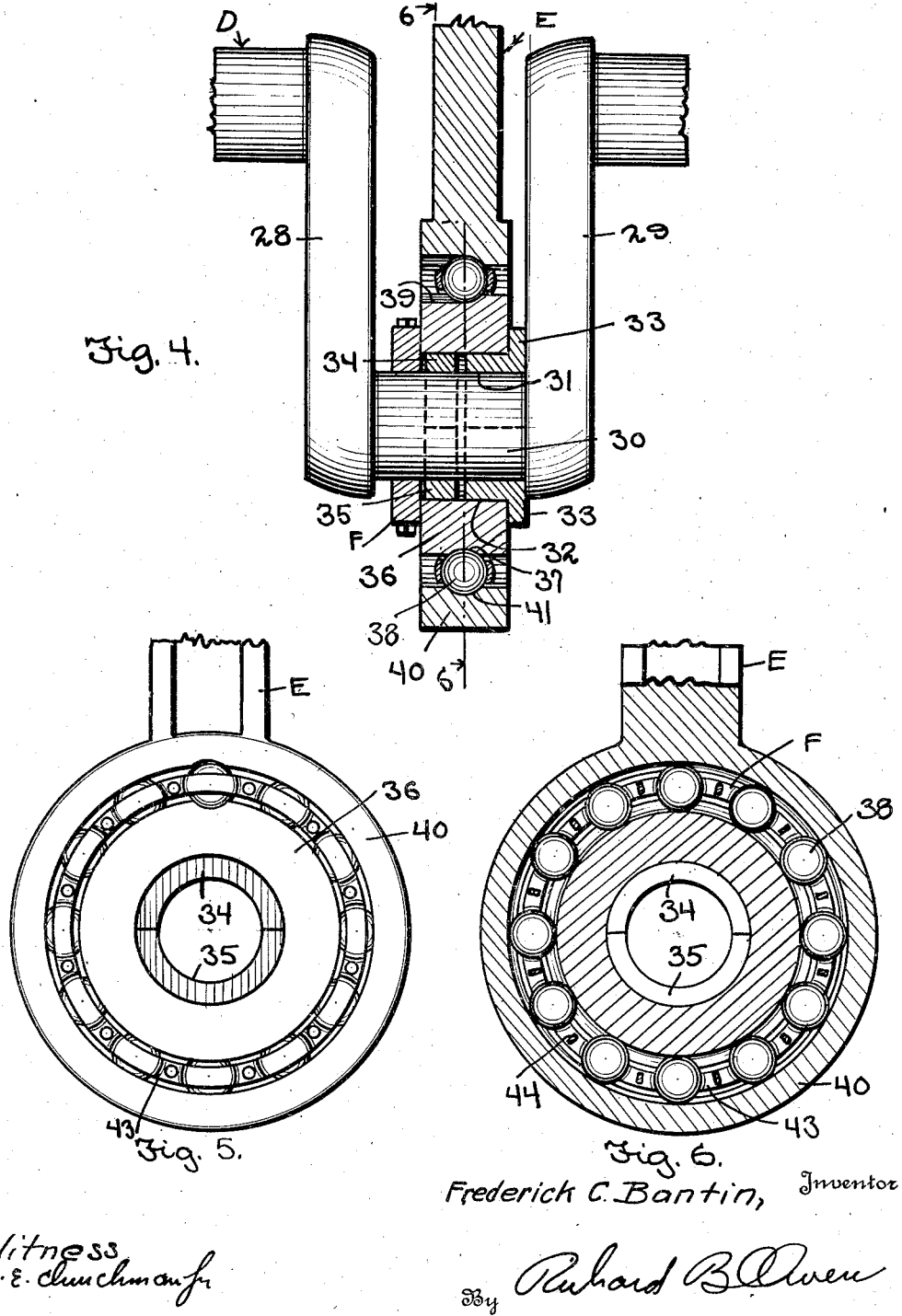

1,776,746

UNITED STATES PATENT OFFICE

FREDERICK C. BANTIN, OF SALAMANCA, NEW YORK

BALL-BEARING CONNECTION

Application filed November 5, 1926. Serial No. 146,495.

This invention relates broadly to new and useful improvements in ball bearing connections and more particularly to a novel and simplified ball bearing assembly for securing a connecting rod to a crank shaft.

An important object of the present invention is to improve generally the manner of securing a connecting rod to a crank shaft so that the amount of friction between those elements will be reduced to a minimum.

Another object of the invention is to provision of such an improved ball bearing connection which consists of a minimum number of parts, all of which may be readily assembled and disassembled relative to one another so that any worn or broken parts may be easily and quickly renewed.

A further object of the present invention is to provide such a ball bearing connection, which, while simple in its construction is nevertheless strong, sturdy and durable, one which is practical and efficient in its operation, and one which can be manufactured and placed on the market at a reasonable cost.

With these and numerous other objects in view, the invention resides in the novel construction, combination and arrangement of parts which will be hereinafter more fully described, illustrated in the accompanying drawings and particularly pointed out in the appended claim.

In the drawings forming a part of this application:

Figure 1 is a vertical transverse central sectional view through a ball bearing connection constructed in accordance with the present invention showing the manner in which the same is utilized to secure a connecting rod to the crank pin of a crank shaft.

Figure 2 is a side elevation of the ball bearing assembly removed from the crank shaft.

Figure 3 is a vertcal sectional view taken on the line 3—3 of Figure 1.

Figure 4 is a view similar to Figure 1 showing a somewhat modified type of ball bearing connection.

Figure 5 is a side elevation of the form of the invention shown in Figure 4 removed from the crank shaft.

Figure 6 is a section view taken on the line 6—6 of Figure 4.

Referring now more particularly to the accompanying drawings and especially to Figures 1 to 3 inclusive, wherein has been shown one practical embodiment of the present invention, the letter A generally indicates a crank shaft, B a connecting rod and C my improved ball bearing assembly for securing the connecting rod B to the crank shaft A.

The crank shaft A is constructed with the usual throw arm comprising the spaced crank cheeks 9 and 10 and the cylindrical crank pin 11.

Carried by and encircling the crank pin 11 is a two-part sleeve comprising the semi-circular sections 12 and 13, each being provided at one side thereof with an outwardly directed flange 14 and when the said sections are placed around the crank pin, the flanges 14 will present one continuous annular flange.

Encircling the semi-circular sleeve sections 12 and 13 are the ball bearing supporting rings 15 and 16, the ring 15 adapted to contact with the annular flange 14 and being provided with an inner beveled face 17 while the ring 16 is arranged outwardly of the ring 15 and has an inner bevelled face, 18, the said bevelled faces 17 and 18 forming an annular ball bearing receiving channel substantially V-shaped in cross section as shown in Figure 1. Supported upon and between the rings 15 and 16 and resting upon the bevelled faces 17 and 18 thereof are the bearing balls 19.

The lower end of the connecting rod B has cast integral therewith a ring 20, the inner face of which is arcuately curved transversely as indicated at 21 and adapted to be engaged by the bearing balls 19. In order to secure the balls 19 and associated parts in proper position, there is provided a two-part locking ring comprising the sections 22 and 23 which encircle the crank pin 11. Passing through the said locking ring sections at opposite sides of the crank pin are the securing bolts 24 and 25, each receiving upon its outer end a suitable nut 26.

When it is desired to secure the connecting rod B to the crank pin 11 of the crank shaft A, the semi-circular sleeve sections 12 and 13 are first placed around the crank pin in the manner set forth hereinabove after which the supporting ring 15 is slipped over the said sleeve sections 12 and 13 and engaged against the flanges 14. The ring 20 carried by the lower end of the connecting rod B is then slipped over the ring 14 and the bearing balls 19 are then placed in position after which the outer supporting ring 16 is inserted over the semi-circular ring sections 12 and 13 so as to retain the bearing balls 19 in place. The two sections 22 and 23 of the locking ring are then placed around the crank pin 11 and forced inwardly into engagement with the outer supporting ring 16, the securing bolts 24 and 25 are then secured in position whereupon the connecting rod B will be firmly secured to the crank pin 11. The locking ring not only serves to retain the outer supporting ring 16 in place but further serves to prevent any lateral movement of the connecting rod relative to the crank shaft.

Referring now more especially to Figures 4 to 6 inclusive, wherein has been disclosed a somewhat modified form of the present invention, the letter D generally indicates the crank shaft, E the connecting rod and F the improved ball bearing assembly for securing the connecting rod to the crank shaft. The crank shaft D embodies the usual throw arm comprising the spaced crank cheeks 28 and 29 and the crank pin 30.

Carried by and encircling the crank pin 30 is a two-part sleeve comprising the semi-circular sections 31 and 32, each being provided at one side thereof with an outwardly directed flange 33. Also encircling the crank pin is a two-part ring including the semi-circular sections 34 and 35.

Encircling the semi-circular sleeve and ring sections 31, 33, 34 and 35 is a ball bearing supporting ring 36 adapted to abut the outwardly directed flanges 33 and provided in its outer face with a circumferential groove 37 for receiving the bearing balls 38. An arcuate transverse groove 39 is formed on the periphery of the ring 36, this groove conforming to the contour of the balls to facilitate the mounting of the bearings as will be presently shown.

Cast integral with the lower end of the connecting rod E is an outer bearing supporting ring 40, formed with a circumferential groove 41 adapted to form a race for the bearing balls 38. A transverse ball receiving groove 42 is also formed in this outer ring, this groove being identical in formation with the groove 39. When assembling the structure the grooves 39 and 42 are arranged in radially opposed positions so that a ball bearing may be readily laterally inserted in the circumferential grooves.

After the bearing balls are mounted in proper position in the rings, a bearing cage is positioned thereon, this cage being formed of a pair of circular side rings 43 formed to snugly engage the balls and a plurality of evenly spaced separator plates 44 disposed between the rings and maintaining the same in proper spaced relation.

In order to secure the supporting ring 36 in place there is provided a two-part locking ring including the semi-circular sections 50 and 51 which encircle the crank pin 30 and receive therethrough suitable securing bolts 52 upon the outer ends of which are threaded suitable nuts 53. Thus, it will be seen that any lateral movement of the connecting rod relative to the crank shaft is effectively precluded.

When it is desired to secure the connecting rod E to the crank shaft D, the semi-circular sleeve and ring sections 31, 32, 33 and 34 are first placed around the crank pin 30 in the manner hereinabove described after which the supporting ring 36 is placed in position. The cage rings 43 are then placed in position after which the ball bearings 38 are positioned between rings 36 and 40. The locking ring sections 50 and 51 are placed around the crank pin and secured thereto. It will be noted that the parts of the two forms of structure are readily interchangeable so that a combination of the elements shown can be assembled.

It is believed that from the foregoing the construction and application of the present invention will be readily appreciated and it is to be understood that changes in the details of construction may be resorted to without departing from or sacrificing the spirit of the invention so long as such changes fall within the scope of the appended claim.

What is claimed is:

In combination, a shaft having a throw arm consisting of crank cheeks and a crank pin, a sectional sleeve arranged upon the pin, said sleeve being provided at one end with an outwardly directed flange contacting with one of the cheeks and having its outer end spaced from the other cheek, a second sectional sleeve arranged upon the pin between said first sleeve and other cheek in slightly spaced relation to said first sleeve, a one-piece supporting ring mounted upon the sleeves in contact with the flange and extending slightly beyond said second sleeve, the supporting ring maintaining the sections of the sleeves in assembled relation on the pin, a sectional locking ring mounted upon the pin between said other cheek and the supporting ring and engaging the supporting ring to hold the flange against the cheek, with which it contacts and to maintain said second sleeve within the supporting ring, a second supporting ring surrounding said first supporting ring and spaced therefrom, bearing elements positioned between the supporting rings, and retaining elements passing through the sections of the locking ring at points laterally beyond the pin.

In testimony whereof I affix my signature.

FREDERICK C. BANTIN.